(12) United States Patent
Umeda et al.

(10) Patent No.: US 6,903,538 B2
(45) Date of Patent: *Jun. 7, 2005

(54) POWER SUPPLY APPARATUS

(75) Inventors: Hiroyuki Umeda, Nagoya (JP);
Toshikazu Kuwano, Chino (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/784,015

(22) Filed: Feb. 20, 2004

(65) Prior Publication Data

US 2004/0165407 A1 Aug. 26, 2004

Related U.S. Application Data

(60) Division of application No. 10/123,863, filed on Apr. 16, 2002, which is a continuation-in-part of application No. 10/057,308, filed on Jan. 25, 2002.

(30) Foreign Application Priority Data

Jan. 29, 2001 (JP) .......................................... 2001-20703
Jan. 25, 2002 (JP) .......................................... 2002-17652

(51) Int. Cl.⁷ ............................................... G05F 1/59
(52) U.S. Cl. ........................ 323/268; 323/272; 363/65
(58) Field of Search ................................ 323/268, 269, 323/271, 272, 273, 282; 363/59, 60, 62, 65

(56) References Cited

U.S. PATENT DOCUMENTS

| 4,194,147 A | 3/1980 | Payne ........................ 323/17 |
| 4,502,152 A | 2/1985 | Sinclair ...................... 455/73 |
| 4,581,694 A | 4/1986 | Adam ......................... 363/97 |
| 5,083,078 A | 1/1992 | Kubler et al. ............... 323/268 |
| 5,267,136 A | 11/1993 | Suga et al. .................. 363/65 |
| 5,416,403 A | 5/1995 | Stephens ..................... 323/222 |
| 6,060,869 A | 5/2000 | Shimoda ...................... 323/271 |
| 6,249,110 B1 | 6/2001 | Geyer et al. ................. 323/272 |
| 6,297,624 B1 | 10/2001 | Mitsui et al. ................ 323/316 |
| 6,424,128 B1 | 7/2002 | Hiraki et al. ................ 323/268 |
| 6,597,158 B2 * | 7/2003 | Umeda ........................ 323/268 |

FOREIGN PATENT DOCUMENTS

| JP | 6-289073 | 10/1994 | ........... G01R/27/02 |
| JP | 10-094193 | 4/1998 | ............. H02J/7/34 |
| JP | 10-301642 | 11/1998 | ............. G05F/1/56 |
| JP | 11-003125 | 1/1999 | ............. G05F/1/56 |
| JP | 11-041825 | 2/1999 | ............. H02J/7/00 |
| JP | 2000-011649 | 1/2000 | ......... G11C/11/407 |
| JP | 2000-268562 | 9/2000 | ......... G11C/11/407 |

* cited by examiner

*Primary Examiner*—Jeffrey Sterrett
(74) *Attorney, Agent, or Firm*—Harness, Dickey & Pierce, P.L.C.

(57) ABSTRACT

A DC/DC converter and a series regulator are connected in parallel between an input terminal and an output terminal. At the time of a heavy load, the DC/DC converter is operated. Although the DC/DC converter has a large current consumption of its own, it has a high power conversion efficiency. Accordingly, since a load current increases at the time of a heavy load, it is effective to use the DC/DC converter whose power conversion efficiency is high, and its current consumption can be neglected since the load current is large. On the other hand, at the time of a light load, the series regulator is operated. Although the series regulator has a small current consumption of its own, it has a low power conversion efficiency. Accordingly, at the time of a light load, even when the series regulator is used, its low power conversion efficiency can be neglected because its current consumption is small. Accordingly, the current consumption of its own can be lowered at the time of a light load, and the power conversion efficiency as a whole can be improved when it is used both at a heavy load and a light load.

3 Claims, 13 Drawing Sheets

Fig. 5 A
Fig. 5 B
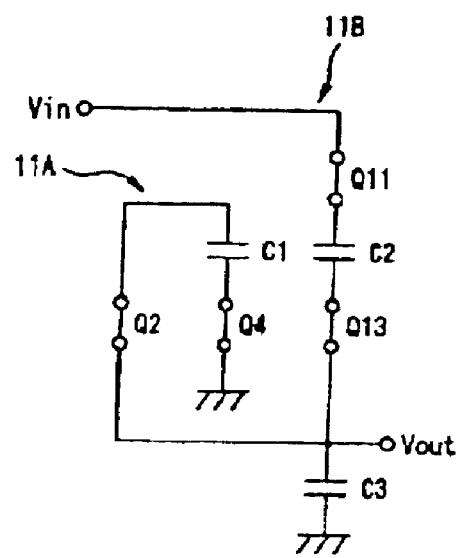
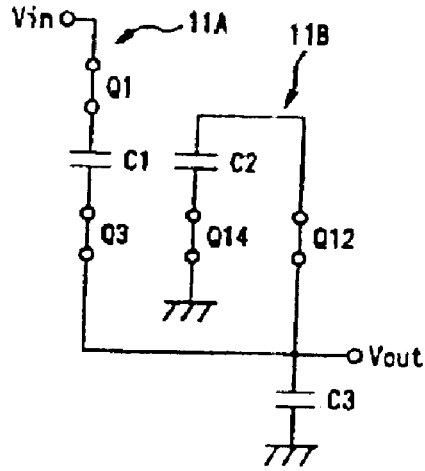
Fig. 6
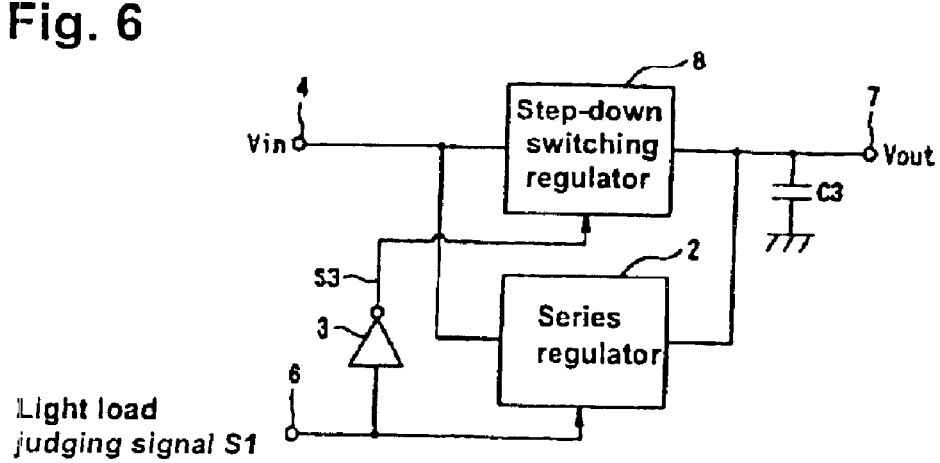

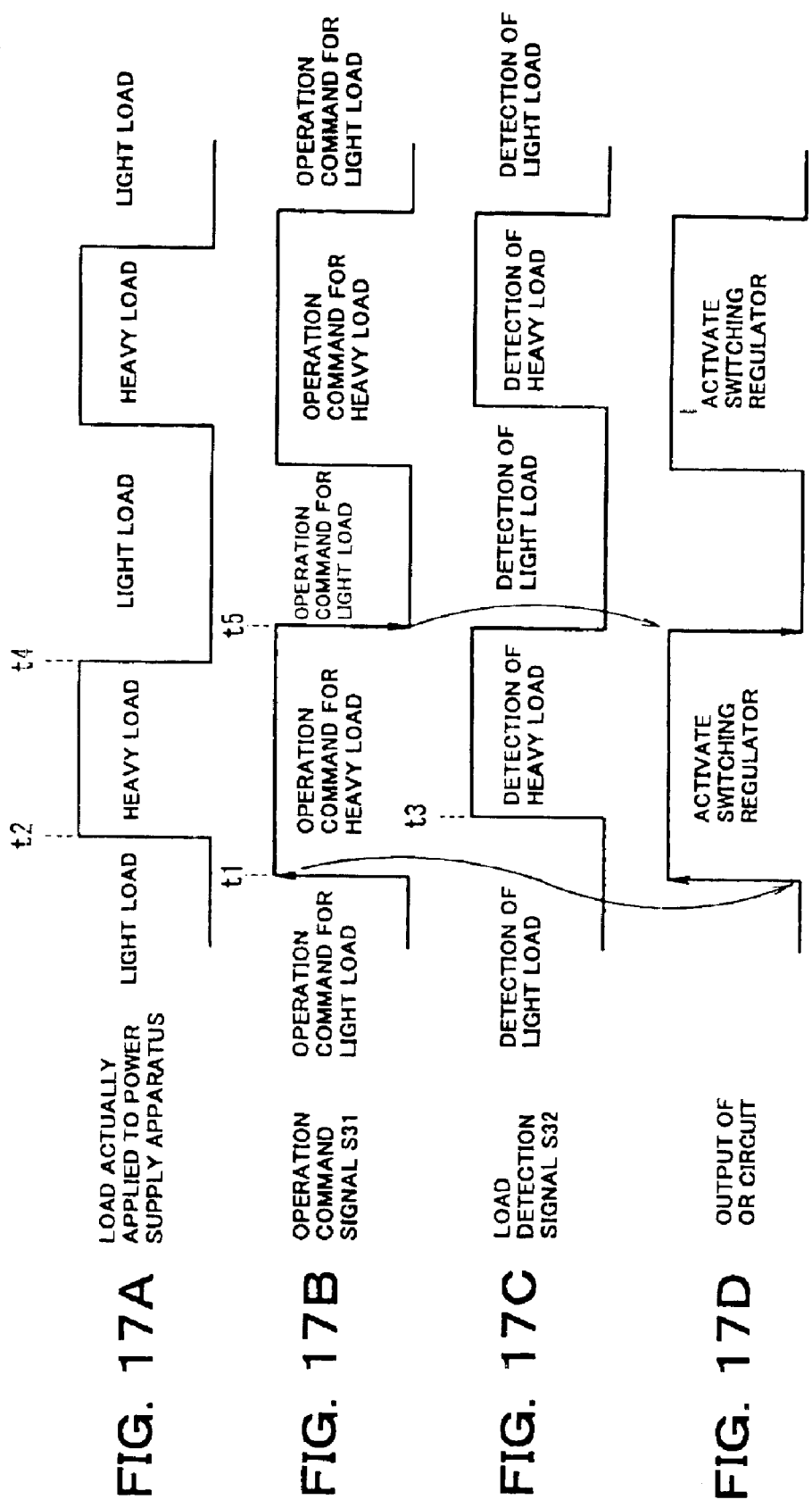

POWER SUPPLY APPARATUS

CROSS REFERENCE TO RELATED APPLICATIONS

This patent application is a division of U.S. patent Ser. No. 10/123,863 filed Apr. 16, 2002, which is a continuation-in-part application based on U.S. patent Ser. No. 10/057,308 filed on Jan. 25, 2001. All the contents of Japanese Patent Application No. 2001-20703 filed on Jan. 29, 2001 and Japanese Patent Application No. 2002-17652 filed on Jan. 25, 2002 are incorporated by reference.

BACKGROUND OF THE INVENTION

The present invention relates to a power supply apparatus that reduces its own current consumption at the time of a light load to thereby eliminate power wastage, to thereby improve an overall power conversion efficiency thereof.

Conventionally, for example, charge pump DC/DC converters and switching regulators are known as power supply apparatuses.

A charge pump DC/DC converter uses charge and discharge of a capacitor to convert an input voltage to a predetermined output voltage.

A switching regulator switches an input voltage and converts the input voltage to a predetermined output voltage.

However, since a charge pump DC/DC converter is designed taking in account of the maximum load for its operation, its own current consumption is the same even when a load condition changes. Therefore, it does not waste the power at the time of a heavy load, but it is inconvenient that its capacity becomes excessive at the time of a light load such that the power is wasted, and the overall power conversion efficiency is lowered.

On the other hand, a switching regulator has a large current consumption but a high power convention efficiency. Accordingly, its high power conversion efficiency is effective at the time of a heavy load. However, it is inconvenient that the overall power conversion efficiency is lowered because its own current consumption is large at the time of a light load.

BRIEF SUMMARY OF THE INVENTION

In view of the above, the present invention may provide a power supply apparatus that reduces its own current consumption at the time of a light load, to thereby improve an overall power conversion efficiency thereof.

In the first aspect of the present invention, a power supply apparatus comprises an input terminal; an output terminal; a charge pump DC/DC converter provided between the input terminal and the output terminal to convert an input voltage that is input in the input terminal into a given output voltage to be outputted toward the output terminal using charge and discharge of a capacitor; and a series regulator connected in parallel with the charge pump DC/DC converter between the input terminal and the output terminal to continuously control the input voltage so that the input voltage becomes the given output voltage to be outputted toward the output terminal. The charge pump DC/DC converter and the series regulator are selectively operated depending on an operation command signal which is pre-generated based on the change of a predicted or scheduled load. In this way, the output voltage can be taken out from the output terminal.

In accordance with the first aspect of the present invention, thus, the charge pump DC/DC converter and series regulator having different characteristics are combined, and the DC/DC converter and the series regulator are selectively operated depending on the size of a load to take out an output voltage on the operation side thereof.

At this point, the charge pump DC/DC converter and series regulator are selectively operated depending on the operation command signal which is pre-generated based on the change of a predicted or scheduled load, whereby the output voltage can be taken out from the output terminal. Therefore, the DC/DC converter and series regulator can be selectively operated depending on the change of a load in an appropriate manner. In the first aspect of the present invention, the DC/DC converter and series regulator can be selectively operated using a load detection signal obtained from detecting the size of a load in addition to the operation command signal. In this way, the DC/DC converter and series regulator can operate with more assurance and stability compared to a case in which only the operation command signal is used.

In the first aspect of the present invention, further, the DC/DC converter can be operated when the load is large and the series regulator can be operated when the load is small.

Although the DC/DC converter has a large current consumption, it has a high conversion efficiency of an output power with respect to an input power. Since the load current increases when the load is large, it is effective to use the DC/DC converter having high power conversion efficiency. In this case, the current consumption in the DC/DC converter can be neglected since the load current is large.

On the other hand, when the load is small, the series regulator is operated selectively. Though having a small current consumption, the series regulator has low power conversion efficiency. Therefore, when the load is small and the series regulator is used, its low power conversion efficiency can be neglected because the current consumption is small.

Accordingly, the current consumption in the power supply apparatus can be reduced when the load is small in comparison with a case in which the load is large. As a result, the entire power conversion efficiency can be improved when the power supply apparatus is used both in the large load and small load.

In the second aspect of the present invention, a power supply apparatus comprises an input terminal; an output terminal; a switching regulator provided between the input terminal and the output terminal to switch and convert an input voltage that is input in the input terminal into a given output voltage to be outputted toward the output terminal; and a series regulator connected in parallel with the switching regulator between the input terminal and the output terminal to continuously control the input voltage so that the input voltage becomes the given output voltage to be outputted toward the output terminal. Furthermore, the switching regulator and the series regulator are selectively operated depending on an operation command signal which is pre-generated based on the change of a predicted or scheduled load. In this way, the output voltage on the operation side can be taken out from the output terminal.

In accordance with the second aspect of the present invention, thus, the switching regulator and series regulator having different characteristics are combined, and the switching regulator and the series regulator are selectively operated depending on the size of a load to take out an output voltage on the operation side thereof.

In accordance with the second aspect of the present invention, further, the switching regulator and series regulator are selectively operated depending on an operation command signal which is pre-generated based on the change of a predicted or scheduled load. Therefore, the switching regulator and series regulator can be selectively operated depending on the change of a load in an appropriate manner.

In the second aspect of the present invention, the switching regulator and series regulator can be selectively operated using a load detection signal obtained from detecting the size of a load in addition to the operation command signal. In this way, the DC/DC converter and series regulator can operate with more assurance and stability compared to a case in which only the operation command signal is used.

In the second aspect of the present invention, further, the switching regulator can be operated when the load is large and the series regulator can be operated when the load is small.

Although the switching regulator has a large current consumption, it has a high conversion efficiency of an output power with respect to an input power. Accordingly, since a load current increases when the load is large it is effective to use the switching regulator with high power conversion efficiency. In this case, the current consumption in the switching regulator can be neglected since the load current is large.

On the other hand, when the load is small, the series regulator is operated. Although the series regulator has a small current consumption, it has low power conversion efficiency. Therefore, when the load is small and the series regulator is used, its low power conversion efficiency can be neglected because the current consumption is small.

Thus, when the load is small, the current consumption in the power supply apparatus can be reduced in comparison with when the load is large. As a result, the entire power conversion efficiency can be improved when the power supply apparatus is used both in the large load and small load.

In the third aspect of the present invention, a power supply apparatus comprises an input terminal; an output terminal; a charge pump DC/DC converter provided between the input terminal and the output terminal to convert an input voltage that is input in the input terminal into a given output voltage to be outputted toward the output terminal using charge and discharge of a capacitor; and a series regulator connected in parallel with the charge pump DC/DC converter between the input terminal and the output terminal to continuously control the input voltage so that the input voltage becomes the given output voltage to be outputted toward the output terminal. Then, the series regulator is operated at all times and the DC/DC converter is operated depending on the size of a load.

In the third aspect of the present invention, the DC/DC converter and series regulator having different characteristics are combined. The series regulator having a small capacity is operated at all times while the DC/DC converter having a large capacity is selectively operated depending on the size of a load. Therefore, the current consumption can be reduced when the load is small. Thus, the entire power conversion efficiency in the power supply apparatus can be improved. In addition, the DC/DC converter can be selectively operated in an appropriate manner depending on the change of a load.

The operation of the DC/DC converter can be controlled using an operation control signal which is pre-generated based on the predicted or scheduled change of a load. Furthermore, the operation of the DC/DC converter may be controlled using a load detection signal which is obtained from detecting the size of a load in addition to the operation control signal.

In the fourth aspect of the present invention, a power supply apparatus comprises an input terminal; an output terminal; a switching regulator provided between the input terminal and the output terminal to switch and convert an input voltage that is input in the input terminal into a given output voltage to be outputted toward the output terminal; and a series regulator connected in parallel with the switching regulator between the input terminal and the output terminal to continuously control the input voltage so that the input voltage becomes the given output voltage to be outputted toward the output terminal. Then, the series regulator is operated at all times and the switching regulator is operated depending on the size of a load.

In the fourth aspect of the present invention, the switching regulator and series regulator having different characteristics are combined. The series regulator having a small capacity is operated at all times while the switching regulator having a large capacity is selectively operated depending on the size of a load. Therefore, the current consumption can be reduced when the load is small and the entire power conversion efficiency in the power supply apparatus can be improved. In addition, the switching regulator can be selectively operated in an appropriate manner depending on the change of a load.

The operation of the switching regulator can be controlled using an operation control signal which is pre-generated based on the predicted or scheduled change of a load. Furthermore, the operation of the switching regulator may be controlled using a load detection signal which is obtained from detecting the size of a load in addition to the operation control signal.

BRIEF DESCRIPTION OF THE SEVERAL VIEWS OF THE DRAWING

FIGS. 5A and 5B show diagrams that are used to describe another example of an operation of the step-down charge pump circuit;

FIG. 6 shows a block diagram of a structure of a power supply apparatus in accordance with a second embodiment of the present invention.

FIGS. 17A to 17D show waveforms at various parts in the eighth embodiment.

DETAILED DESCRIPTION OF THE EMBODIMENT

A power supply apparatus in accordance with a first embodiment of the present invention is described below with reference to FIG. 1.

Figure 1:
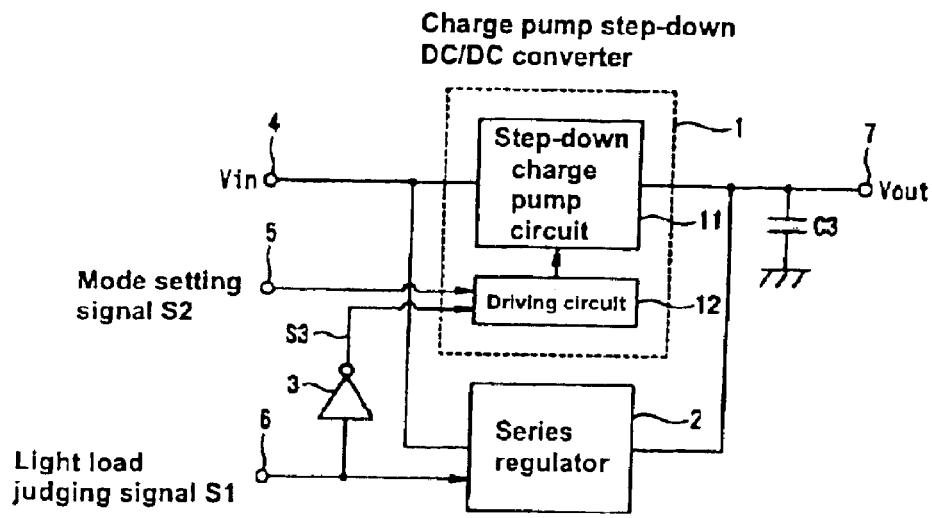
FIG. 1 shows a block diagram of a structure of a power supply apparatus in accordance with a first embodiment of the present invention.

As shown in FIG. 1, the power supply apparatus in accordance with the first embodiment of the present invention is equipped with a charge pump step-down DC/DC converter 1 and a series regulator 2 connected in parallel between an input terminal 4 and an output terminal 7, The step-down DC/DC converter 1 and the series regulator 2 are selectively operated based on a light load judging signal S1, and an output voltage on the operating side is taken out from an output terminal 3.

The step-down DC/DC converter 1 uses charge and discharge of a capacitor to convert an input voltage Vin inputted into the input terminal 4 into a predetermined output voltage Vout, and is composed of a step-down charge pump circuit 11 and a driving circuit 12 that drives the step-down charge pump circuit 11.

Figure 2:
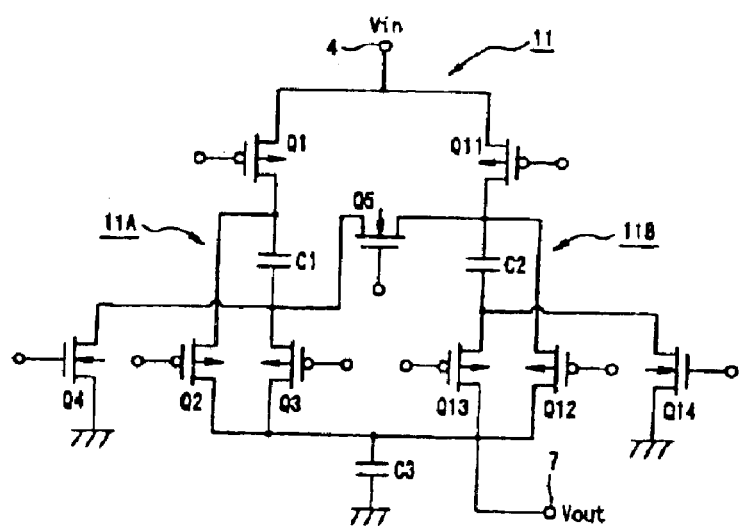
FIG. 2 shows a circuit diagram of a concrete structure of a step-down charge pump circuit.

The step-down charge pump circuit 11 is formed from, for example, as shown in FIG. 2, a first charge pump circuit 11A that is composed of switching MOS transistors Q1 to Q4 and a capacitor C1, a second charge pump circuit 12A that is composed of switching MOS transistors Q11 to Q14 and a capacitor C2, a switching MOS transistor Q5 that is capable of connecting the first charge pump circuit 11A and the second charge pump circuit 12A, and a capacitor C3 for output.

More particularly, the MOS transistor Q1 has a source that is connected to the input terminal 4 and a drain that is connected to a source of the MOS transistor Q3 through the capacitor C1. A drain of the MOS transistor Q3 is connected to an output terminal 7. Also, the MOS transistor Q2 has a source that is connected to the drain of the MOS transistor Q1 and a drain that is connected to the output terminal 7. Furthermore, the MOS transistor Q4 has a drain that is connected to the source of the MOS transistor Q3 and a source of the MOS transistor Q5, and has a source that is grounded. The capacitor C3 is connected between the output terminal 7 and the ground.

The MOS transistor Q11 has a source that is connected to the input terminal 4 and a drain that is connected to a source of the MOS transistor Q13 through the capacitor C2 and also to a drain of the MOS transistor Q5. A drain of the MOS transistor Q13 is connected to the output terminal 7. Also, the MOS transistor Q12 has a source that is connected to the drain of the MOS transistor Q11 and a drain that is connected to the output terminal 7. Furthermore, the MOS transistor Q14 has a drain that is connected to the source of the MOS transistor Q13 and a source thereof connected to the ground.

Predetermined driving signals are inputted from the driving circuit 12 shown in FIG. 1 to respective gates of the MOS transistors Q1 to Q5 and Q11 to Q14, so that the MOS transistors Q1 to Q5 and Q11 to Q14 are controlled to turn on and off by the driving signals.

The driving circuit 12 generates driving signals that drive the MOS transistors Q1 to Q5 and Q11 to Q14 of the step-down charge pump circuit 11 based on an oscillation signal provided by an oscillation circuit (not shown) according to a mode that is set by a mode setting signal S2 which is inputted in a mode setting terminal 5.

Modes that can be set by the mode setting signal S1 include a mode of complementarily driving or non-complimentarily driving the step-down charge pump circuit 11, and a mode of a step-down amplification of input voltage (for example, at 1/1 amplification, 1/2 amplification, 2/3 amplification or the like).

Also, the driving circuit 12 can stop its operation or prohibit its output based on an inverted signal S3 that is provided by inverting the light load judging signal S2 inputted in a control input terminal 6 by an inverter 3.

Figure 3:
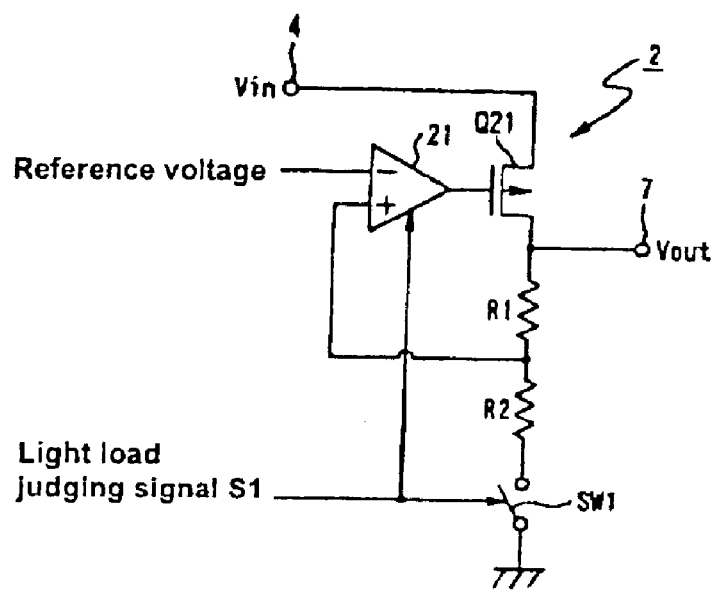
FIG. 3 shows a circuit diagram of a concrete structure of a series regulator.

The series regulator 2 receives an input voltage Vin, and continuously controls its output voltage Vout so that the output voltage Vout becomes a predetermined voltage, and has a structure shown in FIG. 3, for example.

More particularly, in the series regulator 2, a MOS transistor Q21 is connected between an input terminal 4 and an output terminal 7, and a resistor R1, a resistor R2 and a switch SW1 are serially connected between the output terminal 7 and a ground. An error amplifier 21 compares a divided voltage obtained by dividing the output voltage Vout by the resistors R1 and R2 with a reference voltage, and applies an output voltage according to the comparison to a gate of the MOS transistor Q21 to thereby control the on-resistance of the MOS transistor Q21, so that a predetermined output voltage can be obtained.

The error amplifier 21 controls to turn on and off its output voltage by the light load judging signal S1 inputted in the control input terminal 6. Also, the switch SW1 is controlled to open or close by the light load judging signal S1.

Next, an operation of the first embodiment having the composition described above is described with reference to the drawings.

When the load in the first embodiment is heavy, the light load judging signal S1 becomes, for example, an "L" level. As a result, the light load judging signal S1 is inputted unchanged in the error amplifier 21 and the switch SW1 of the series regulator 2, and it is inverted by the inverter 3 to an "H" level and then inputted in the driving circuit 12 of the step-down DC/DC converter 1.

As a result, on the side of the step-down DC/DC converter 1, the driving circuit 12 is placed in an operation state or in a state in which driving signals can be outputted. Accordingly, predetermined driving signals from the driving circuit 12 according to the mode set by the mode setting signal S2 are inputted in the corresponding gates of the MOS transistors Q1 to Q5 and Q11 to Q14. As a result, the step-down charge pump circuit 11 operates according to the set mode, and generates a predetermined output voltage Vout, which is outputted toward the output terminal 7.

Meanwhile, on the side of the series regulator 2, outputs from the error amplifier 21 are prohibited, and the switch SW1 is placed in an open state, such that the series regulator 2 does not operate, or does not generate any output voltage.

Next, when the load in the first embodiment is light, the light load judging signal S1 becomes, for example, an "H"

level. As a result, the light load judging signal S1 is inputted unchanged in the error amplifier 21 and the switch SW1 of the series regulator 2, and it is inverted by the inverter 3 to an "L" level and then inputted in the driving circuit 12 of the step-down DC/DC converter 1.

As a result, on the side of the step-down DC/DC converter 1, the driving circuit 12 is placed in a state in which its operation is stopped or in a state in which outputs of driving signals are prohibited. Accordingly, the driving circuit 12 does not output any driving signals, such that the step-down charge pump circuit 11 stops its operation and any output voltage is generated.

Meanwhile, on the side of the series regulator 2, it is placed in a state in which an output voltage from the error amplifier 21 can be outputted, and the switch SW1 is placed in a closed state, such that the series regulator 2 is placed in an operation state, and its output voltage is outputted toward the output terminal 7.

Next, one example in which the step-down charge pump circuit 11 operates according to a mode set by the mode setting signal S2 is described with reference to FIGS. 4A, 4B, 5A and 5B.

First, one case is described with reference to FIGS. 4A and 4B where a mode is set in a complementary operation and at a step-down voltage in 1/1 amplification.

Figure 4:
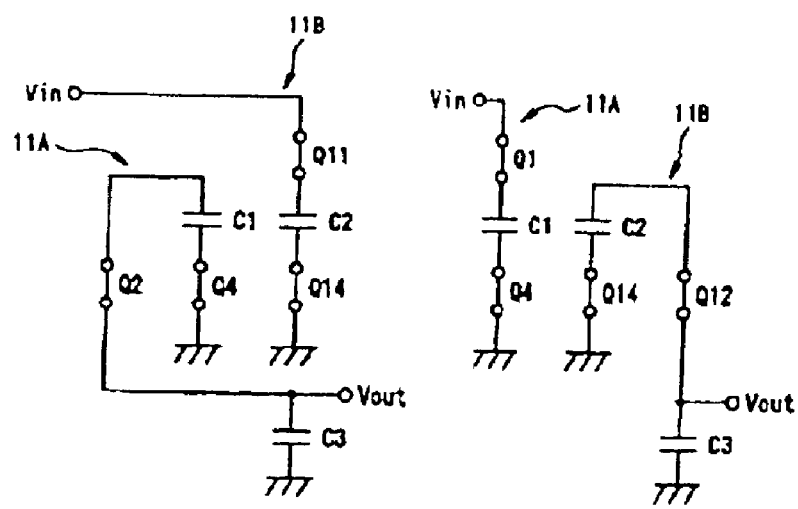
FIGS. 4A and 4B show diagrams that are used to describe an example of an operation of the step-down charge pump circuit.

In this case, the first and second charge pump circuits 11A and 11B are placed in a state shown in FIG. 4A in a first period, and in a state shown in FIG. 4B in a second period. The operations in the first period and the second period are alternately repeated.

In other words, in the first period, in the first charge pump circuit 11A, only the MOS transistors Q2 and Q4 are turned on by the driving circuit 12, and a charged voltage of the capacitor C1 in the second period in a previous round becomes to be an output voltage Vout (see FIG. 4A).

Also, in the same first period, in the second charge pump circuit 11B, only the MOS transistors Q11 and Q14 are turned on by the driving circuit 12, and the capacitor C2 is charged with an input voltage Vin (see FIG. 4A).

In contrast, in the second period, in the first charge pump circuit 11A, only the MOS transistors Q1 and Q4 are turned on by the driving circuit 12, and the capacitor C2 is charged with an input voltage Vin (see FIG. 4B).

Also, in the same second period, in the second charge pump circuit 11B, only the MOS transistors Q12 and Q14 are turned on by the driving circuit 12, and a charged voltage of the capacitor C2 in the first period becomes to be an output voltage Vout (see FIG. 4B).

Next, one case is described with reference to FIGS. 5A and 5B where a mode is set in a complementary operation and at a step-down voltage in 1/2 amplification.

In this case, the first and second charge pump circuits 11A and 11B are placed in a state shown in FIG. 5A in a first period, and in a state shown in FIG. 5B in a second period. The operations of the first period and the second period are alternately repeated. A detailed description thereof is omitted here.

As described above, in the first embodiment, the charge pump step-down DC/DC converter 1 is operated when the load is heavy. Although the step-down DC/DC converter 1 has a large current consumption of its own, for example, at 100 (A, it has a high conversion efficiency of an output power with respect to an input power (a power conversion efficiency), for example, at 90%. Accordingly, since a load current increases at the time of a heavy load, it is effective to use the step-down DC/DC converter 1 whose power conversion efficiency is high, and its current consumption can be neglected since the load current is large.

On the other hand, at the time of a light load, the series regulator 2 is operated. Although the series regulator 2 has a small current consumption of its own, for example, at 1 (A, it has a low power conversion efficiency, for example, at 60%. Accordingly, at the time of a light load, when the series regulator 2 is used, its low power conversion efficiency can be neglected because its current consumption is small.

Accordingly, in accordance with the first embodiment, since its current consumption can be reduced at the time of a light load compared to at the time of a heavy load, the power conversion efficiency as a whole can be improved when it is used both at heavy load and light load. For this reason, in particular, when a battery-operated electronic appliance is operated in a stand-by state, wasteful power consumption of the battery can be prevented, and the battery can be used for a longer time.

It is noted that, in the first embodiment, the step-down DC/DC converter 1 and the series regulator 2 are selectively operated to take out an output voltage at an operation side thereof. Accordingly, it is necessary to prevent occurrence of a period in which no output voltage is generated when the operations are switched from one to the other. A device that copes with this point is described.

First, a case in which an operation of the step-down DC/DC converter 1 is switched to an operation of the series regulator 2 is described.

In this instance, the light load judging signal S1 changes from an "L" level to an "H" level, which immediately sets a state in which the error amplifier 21 on the side of the series regulator 2 can output an output voltage, and the switch SW1 is closed. As a result, the series regulator 2 immediately starts its operation.

Meanwhile, an appropriate device may be used to detect a change in the light load judging signal S1. A timer (not shown) is started upon detection thereof and counts a predetermined time, and a finish signal is generated after the counting is completed. Then, the finish signal is used to set a state in which the driving circuit 12 on the side of the step-down DC/DC converter 1 stops its operation or a state in which outputs of the driving signals are prohibited. As a result, the step-down DC/DC converter starts its operation after the operation of the series regulator 2 becomes stable.

The operation described above prevents occurrence of a period in which no output voltage is generated when an operation of the step-down DC/DC converter 1 is switched to an operation of the series regulator 2.

Next, conversely, a case in which an operation of the series regulator 2 is switched to an operation of the step-down DC/DC converter 1 is described.

In this instance, the light load judging signal S1 changes from an "H" level to an "L" level, which is converted by the inverter 3 and inputted in the driving circuit 12 on the side of the step-down DC/DC converter 1. As a result, the driving circuit 12 immediately shifts to an operation state or a state in which driving signals can be outputted, and the step-down DC/DC converter 1 immediately starts its operation.

Meanwhile, an appropriate device may be used to detect a change in the light load judging signal S1. A timer is started upon detection thereof and counts a predetermined time, and a finish signal is generated after the counting is completed. Then, the finish signal is used to set a state in which the error amplifier 21 on the side of the series regulator 2 does not output an output voltage, and the switch SW1 is opened. As a result, the series regulator 2 stops its operation after the operation of the step-down DC/DC converter 1 becomes stable.

The operation described above prevents occurrence of a period in which no output voltage is generated when an operation of the series regulator 2 is switched to an operation of the step-down DC/DC converter 1.

Next, a power supply apparatus in accordance with a second embodiment of the present invention is described with reference to FIG. 6.

As shown in FIG. 6, the power supply apparatus in accordance with the second embodiment of the present invention is equipped with a step-down switching regulator 8 and a series regulator 2 connected in parallel between an input terminal 4 and an output terminal 7. The step-down switching regulator 8 and the series regulator 2 are selectively operated based on a light load judging signal S1, and an output voltage on an operation side thereof is taken out from an output terminal 3.

The series regulator 2 is the same as the series regulator 2 shown in FIG. 1 and FIG. 3.

Figure 7:
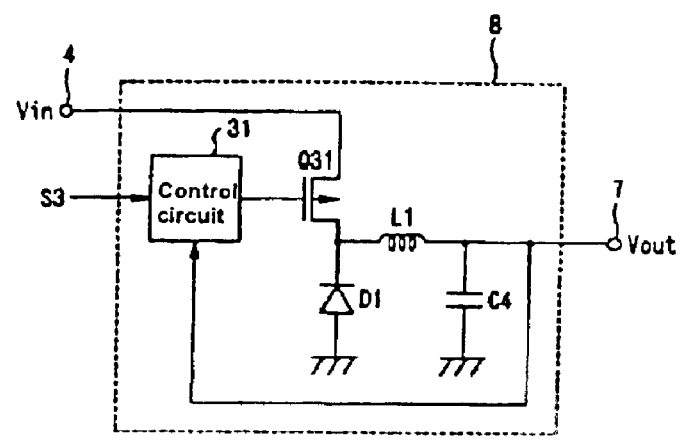
FIG. 7 shows a circuit diagram of a concrete structure of a step-down switching regulator.

The step-down switching regulator 8 switches an input voltage and converts the input voltage into a predetermined output voltage, and has a structure shown in FIG. 7, for example.

The step-down switching regulator 8 includes a MOS transistor Q31 and a coil L1 serially connected between an input terminal 4 and output terminal 7. Also, one end of the coil L1 is connected to a ground through a diode D1, and the other end of the coil L1 is connected to a ground through a capacitor C4.

A control circuit 31 generates a switching signal whose pulse frequency or pulse width changes according to size of an output voltage Vout, and controls to turn on and off the MOS transistor Q31 by the switching signal, whereby a required output voltage is obtained.

Also, the control circuit 31 is placed to stop its operation or is prohibited from providing outputs based on an inverted signal S3 that is provided by inverting the light load judging signal S1 inputted from a control input terminal 6 by an inverter 3.

Next, an operation of the second embodiment having the composition described above is described with reference to the drawings.

When the load in the second embodiment is heavy, the light load judging signal S1 becomes, for example, an "L" level. As a result, the light load judging signal S1 is inputted unchanged in an error amplifier 21 and a switch SW1 of the series regulator 2, and it is inverted by the inverter 3 to an "H" level to an inverted signal S3, which is then inputted in the control circuit 31 of the step-down switching regulator 8.

As a result, on the side of the step-down switching regulator 8, the control circuit 31 is placed in an operation state or in a state in which it can provide outputs. Accordingly, the step-down switching regulator 8 is placed in an operation state, such that a required output voltage is obtained.

Meanwhile, on the side of the series regulator 2, the error amplifier 21 does not output an output voltage, and the switch SW1 is placed in an open state, such that the series regulator 2 does not generate any output voltage.

Next, when the load in the first embodiment is light, the light load judging signal S1 becomes, for example, an "H" level. As a result, the light load judging signal S1 is inputted unchanged in the error amplifier 21 and the switch SW1 of the series regulator 2, and it is inverted by the inverter 3 to an "L" level to an inverted signal S3, which is then inputted in the control circuit 31 of the step-down switching regulator 8.

As a result, on the side of the step-down switching regulator 8, the control circuit 31 is placed in a state in which its operation is stopped or in a state in which outputs of driving signals are prohibited. Accordingly, the control circuit 31 does not output any switching signals, such that the step-down switching regulator 8 stops its operation and no output voltage is output therefrom.

Meanwhile, on the side of the series regulator 2, it is placed in a state in which an output voltage from the error amplifier 21 can be outputted, and the switch SW1 is placed in a closed state, such that the series regulator 2 is placed in an operation state, and its output voltage is outputted toward the output terminal 7.

As described above, in the second embodiment, the step-down switching regulator 8 is operated at the time when the load is heavy. Although the step-down switching regulator 8 has a large current consumption of its own, for example, at 100 (A, it has a high conversion efficiency of an output power with respect to an input power (a power conversion efficiency), for example, at 90%. Accordingly, since a load current increases at the time of a heavy load, it is effective to use the step-down switching regulator 8 whose power conversion efficiency is high, and its current consumption can be neglected since the load current is large.

On the other hand, at the time of a light load, the series regulator 2 is operated. Although the series regulator 2 has a small current consumption of its own, for example, at 1 (A, it has a low power conversion efficiency, for example, at 60%. Accordingly, at the time of a light load, when the series regulator 2 is used, its low power conversion efficiency can be neglected because its current consumption is small.

Accordingly, in accordance with the second embodiment, since its current consumption can be reduced at the time of a light load compared to that at the time of a heavy load, the power conversion efficiency as a whole can be improved when it is used both at a heavy load and a light load. For this reason, in particular, when a battery-operated electronic appliance is operated in a stand-by state, wasteful power consumption of the battery can be prevented, and the battery can be used for a longer time.

It is noted that, in the second embodiment, the step-down switching regulator 8 and the series regulator 2 are selectively operated to take out an output voltage at an operation side thereof. Accordingly, it is necessary to prevent occurrence of a period in which no output voltage is generated when the operations are switched from one to the other. A device that copes with this point is described.

First, a case in which an operation of the step-down switching regulator 8 is switched to an operation of the series regulator 2 is described.

In this instance, the light load judging signal S1 changes from an "L" level to an "H" level, which immediately sets a state in which the error amplifier 21 on the side of the series regulator 2 can output an output voltage, and the switch SW1 is closed. As a result, the series regulator 2 immediately starts its operation.

Meanwhile, an appropriate device may be used to detect a change in the light load judging signal S1. A timer is started upon detection thereof and counts a predetermined time, and a finish signal is generated after the counting is completed. Then, the finish signal is used to set a state in which the control circuit 31 on the side of the step-down switching regulator 8 stops its operation or a state in which outputs of the driving signals are prohibited. As a result, the step-down switching regulator 8 starts its operation after the operation of the series regulator 2 becomes stable.

The operation described above prevents occurrence of a period in which no output voltage is generated when an operation of the step-down switching regulator 8 is switched to an operation of the series regulator 2.

Next, conversely, a case in which an operation of the series regulator 2 is switched to an operation of the step-down switching regulator 8 is described.

In this instance, the light load judging signal S1 changes from an "H" level to an "L" level, which is converted by the inverter 3 and inputted in the control circuit 31 on the side of the step-down switching regulator 8. As a result, the control circuit 31 immediately shifts to an operation state or a state in which driving signals can be outputted. As a result, the step-down switching regulator 8 immediately starts its operation.

Meanwhile, an appropriate device may be used to detect a change in the light load judging signal S1. A timer is started upon detection thereof and counts a predetermined time, and a finish signal is generated after the counting is completed. Then, the finish signal is used to set a state in which the error amplifier 21 on the side of the series regulator 2 does not output an output voltage, and the switch SW1 is opened. As a result, the series regulator 2 stops its operation after the operation of the step-down switching regulator 8 becomes stable.

The operation described above prevents occurrence of a period in which no output voltage is generated when an operation of the series regulator 2 is switched to an operation of the step-down switching regulator 8.

A power supply apparatus constructed in accordance with a third embodiment of the present invention will be described with reference to FIG. 8.

Figure 8:
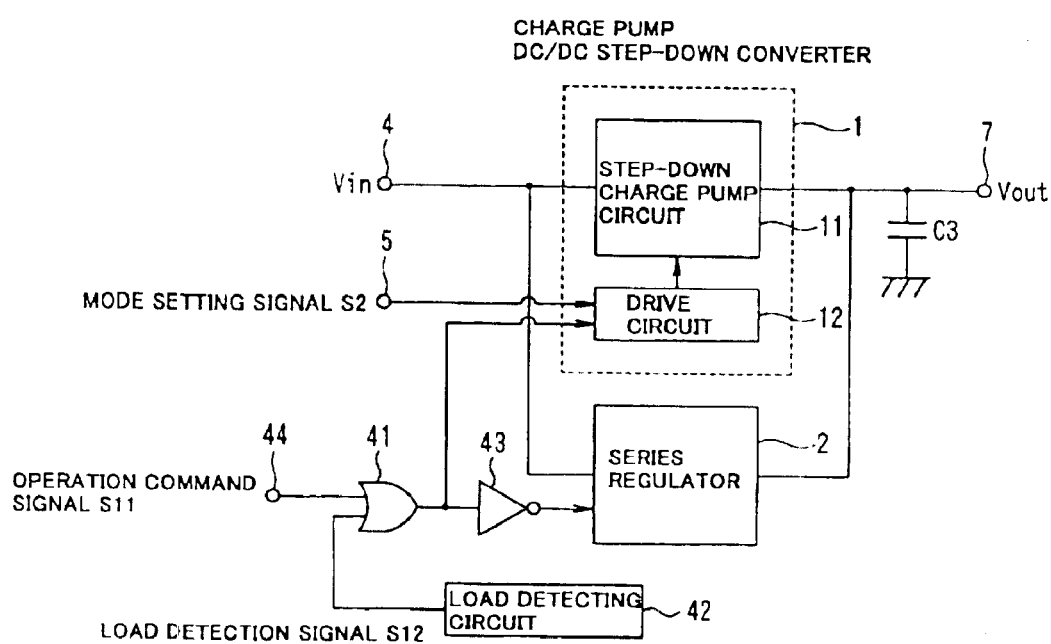
FIG. 8 shows a block diagram of a power supply apparatus constructed in accordance with a third embodiment of the present invention.

As shown in FIG. 8, the power supply apparatus comprises a charge pump step-down DC/DC converter 1 and a series regulator 2, the converter and regulator having different characteristics and being connected in parallel between an input terminal 4 and an output terminal 7. The step-down DC/DC converter and series regulator 1, 2 are selectively operated based on an operation command signal S11 inputted into a control terminal 44 and a load detection signal S12 from a load detecting circuit 42. The output voltage on the operation side is taken out from the output terminal 7.

A load (not shown) is connected to the power supply apparatus of the third embodiment. The load is desirably controlled by a microcomputer (processor) (not shown) through a predetermined program. On controlling the load, thus, the change of a load can be already known or predicted. Therefore, for example, a further program for generating the operation command signal S11 for selectively operating the step-down DC/DC converter 1 and series regulator 2 depending on the predicted or scheduled change of a load may be included in the program.

In the third embodiment, thus, the microcomputer generates the operation command signal S11 when the load is being controlled. The generated operation command signal S11 is inputted into an OR circuit (OR gate) 41. The OR circuit 41 also receives the load detection signal S12 outputted by the load detecting circuit 42 when it detects the size of a load, in addition to the aforementioned operation command signal S11. The output signal of the OR circuit 41 is fed into a drive circuit 12 in the step-down DC/DC converter 1 and also into the series regulator 2 through an inverter 43.

In the third embodiment, therefore, the operation command signal S11 pre-generated depending on the predicted or scheduled change of a load and the load detection signal S12 from the load detecting circuit 42 are ORed by the OR circuit 41, the result being then used to selectively operate the charge pump DC/DC step-down converter 1 or the series regulator 2.

The other components in the third embodiment are similar to those of the first embodiment shown in FIGS. 1–3. Therefore, the similar parts are denoted by similar reference numerals and will not further be described.

Figure 9:
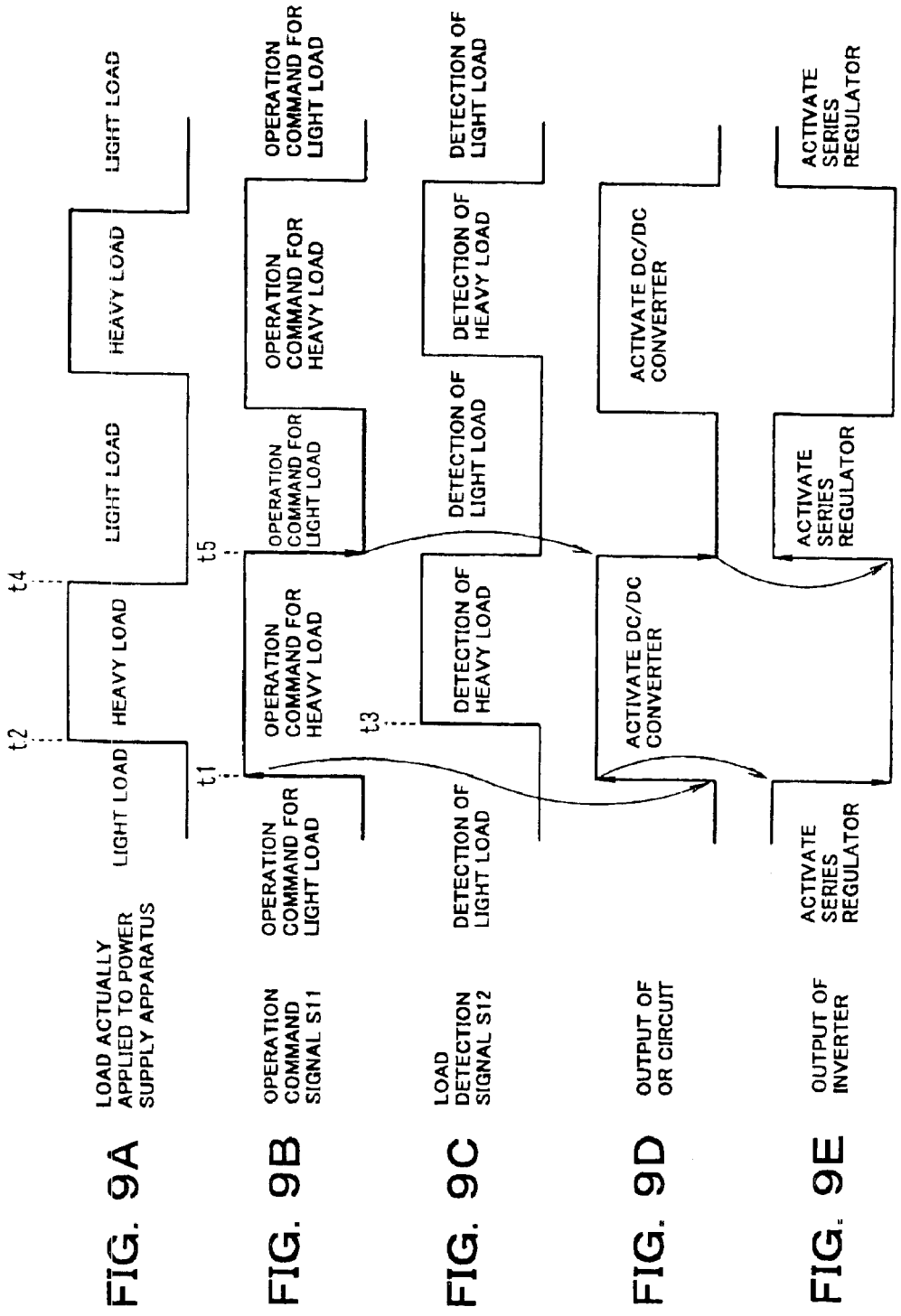
FIGS. 9A to 9E show waveforms at various parts in the third embodiment.

The operation of the power supply apparatus according to the third embodiment will be described with reference to FIGS. 8 and 9.

It will now be described that the load on the power supply apparatus of the third embodiment is controlled by a microcomputer (not shown) and that the load varies as shown in FIG. 9A. It is assumed that the operation command signal S11 corresponding to the already known change of a load as shown in FIG. 9B is inputted into the OR circuit 41.

It is also assumed that the operation command signal S11 is in "H" level for a heavy load and in "L" level for a light load, as shown in FIG. 9B.

When the operation command signal S11 changes from "L" level to "H" level at time t1 as shown in FIG. 9B, the output of the OR circuit 41 varies from "L" level to "H" level as shown in FIG. 9D and the output of the inverter 43 changes from "H" level to "L" level as shown in FIG. 9E.

As a result, the drive circuit 12 is actuated to activate the step-down DC/DC converter 1 while the series regulator 2 is switched to its stop state. Thus, the output voltage of the step-down DC/DC converter 1 will be outputted from the output terminal 7. Therefore, the step-down DC/DC converter 1 can be placed in a stable state for a heavy load.

When the load is subsequently increased at time t2 as shown in FIG. 9A, the step-down DC/DC converter 1 can drive the increased load in a stable manner.

At time t3, the load detection signal S12 from the load detecting circuit 42 varies from "L" level to "H" level, as shown in FIG. 9C. At this time, the operation command signal S11 is in "H" level. Thus, the states of the operating step-down DC/DC converter and series regulator 1, 2 do not change.

Subsequently, the load is reduced at time t4 as shown in FIG. 9A. At this time, the operation command signal S11 is in "H" level. Thus, the states of the operating step-down DC/DC converter and series regulator 1, 2 do not change.

As the operation command signal S11 varies from "H" level to "L" level at time t5 as shown in FIG. 9B, the output of the OR circuit 41 changes from "H" level to "L" level as shown in FIG. 9D. The output of the inverter 43 varies from "L" level to "H" level as shown in FIG. 9E.

Therefore, the drive circuit 12 is stopped to halt the step-down DC/DC converter 1 while the series regulator 2 is activated to output the output voltage of the series regulator toward the output terminal 7.

At time t5, the load detection signal S12 from the load detecting circuit 42 changes from "H" level to "L" level. Therefore, the power supply apparatus can be operated depending on the load even though the operation command signal S11 is not normal at time t5.

Subsequently, such a procedure is repeated so that the step-down DC/DC converter 1 or series regulator 2 can be selectively operated depending on the load.

As described, the third embodiment can reduce the current consumption when the load is light and improve the entire power conversion efficiency in the power supply apparatus as in the first embodiment.

The power supply apparatus according to the third embodiment is designed to selectively operate the step-down DC/DC converter 1 or series regulator 2 by using the operation command signal S11 which has been pre-generated depending on the predicted or scheduled change of a load, thereby taking out the output voltage on the operating side. As a result, the step-down DC/DC converter 1 or series regulator 2 can be appropriately selected and operated depending on the change of a load.

Furthermore, the third embodiment controls the selective operation of the step-down DC/DC converter 1 or series regulator 2 by using the load detection signal S12 in addition to the operation command signal S11. In this way, the power supply apparatus can operate with more assurance and stability compared to a case in which only the operation command signal S11 is used.

Figure 10:
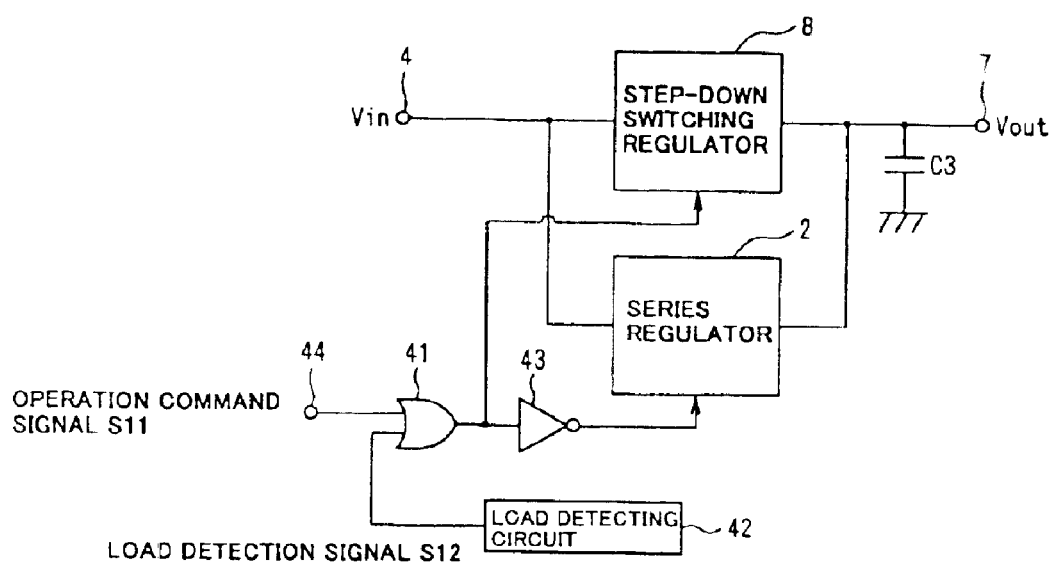
FIG. 10 shows a block diagram of a power supply apparatus constructed in accordance with a fourth embodiment of the present invention.

A power supply apparatus constructed in accordance with a fourth embodiment of the present invention will be described with reference to FIG. 10.

The power supply apparatus of the fourth embodiment comprises a step-down switching regulator 8 and a series regulator 2, which have different characteristics and are connected in parallel between an input terminal 4 and an output terminal 7. The step-down switching regulator 8 and series regulator 2 are selectively operated based on an operation command signal S11 inputted into a control terminal 44 and a load detection signal S12 from a load detecting circuit 42. The output voltage on the operating side is taken out through the output terminal 7.

In the fourth embodiment, a microcomputer (not shown) is used to generate such an operation command signal S11 as described when the load is being controlled, as in the third embodiment. The generated operation command signal S11 is similarly inputted into an OR circuit 41. Similarly, the OR circuit 41 receives the load detection signal S12 outputted from the load detecting circuit 42 when the size of a load is detected. The output of the OR circuit 41 is fed into the step-down switching regulator 8 and also into the series regulator 2 through an inverter 43.

In the fourth embodiment, therefore, the operation command signal S11 pre-generated depending on the predicted or scheduled change of a load and the load detection signal S12 from the load detecting circuit 42 are ORed by the OR circuit 41. The result is then used to selectively operate the step-down switching regulator 8 or series regulator 2.

The other components of the power supply apparatus according to the fourth embodiment are substantially similar to those of the second embodiment shown in FIGS. 6 and 7. Similar parts are denoted by similar reference numerals and will not further be described.

Figure 11:
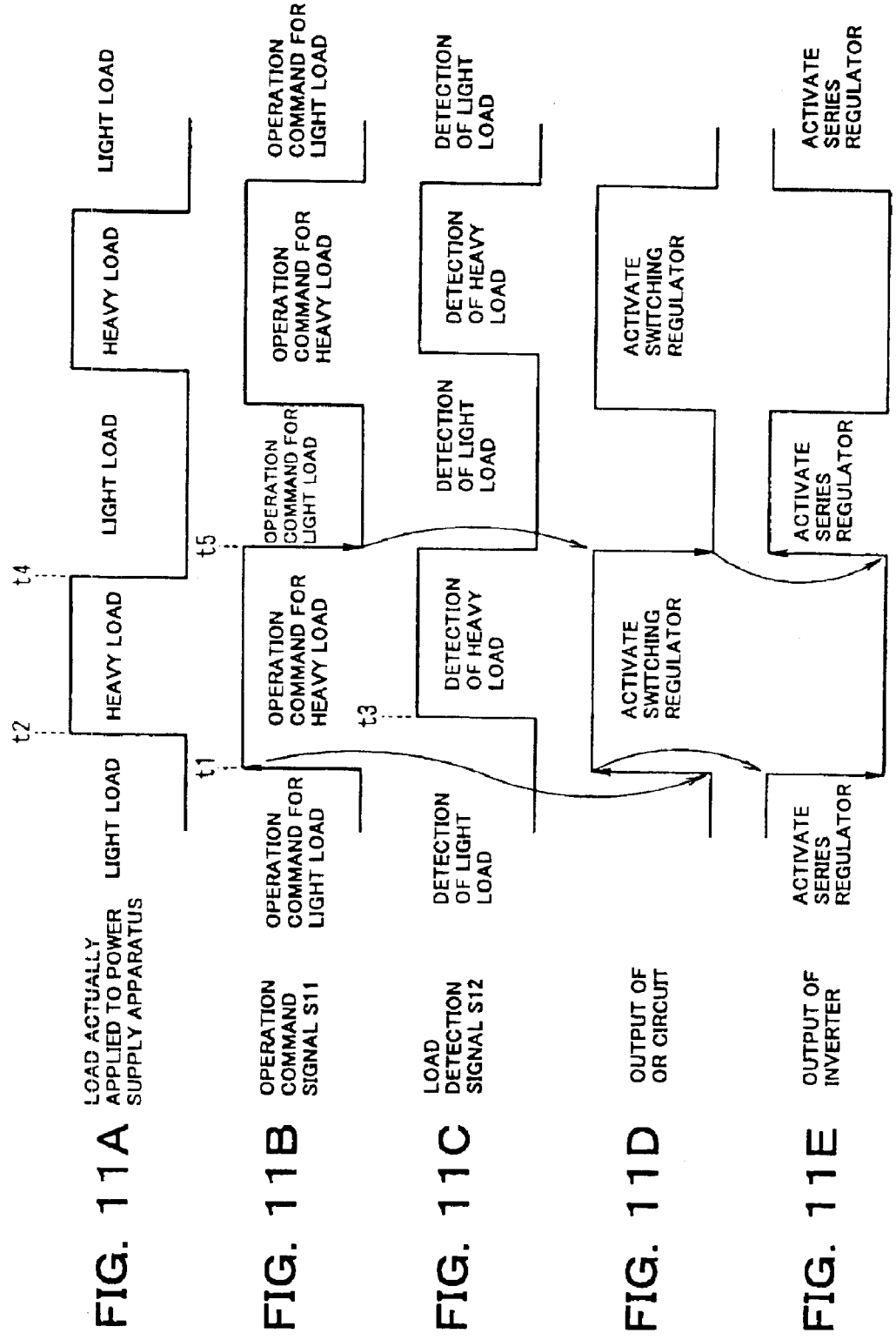
FIGS. 11A to 11E show waveforms at various parts in the fourth embodiment.

The operation of the power supply apparatus according to the fourth embodiment will be described with reference to FIGS. 10 and 11.

It is now assumed that the load on the power supply apparatus of the fourth embodiment is controlled by a microcomputer (not shown) and that the load varies as shown in FIG. 11A. It is also assumed that the operation command signal S11 corresponding to the already known change of a load as shown in FIG. 11B is inputted into the OR circuit 41.

It is further assumed that the operation command signal S11 is in "H" level for a heavy load and in "L" level for a light load, as shown in FIG. 11B.

When the operation command signal S11 changes from "L" level to "H" level as time t1 as shown in FIG. 11B, the output of the OR circuit 41 varies from "L" level to "H" level as shown in FIG. 11D while the output of the inverter 43 changes from "H" level to "L" level as shown in FIG. 11E.

As a result, the step-down switching regulator 8 is activated while the series regulator 2 is switched to its stop state. Thus, the output voltage of the step-down switching regulator 8 is outputted through the output terminal 7. Therefore, the step-down switching regulator 8 can be placed in a stable state for a heavy load.

When the load is subsequently increased at time t2 as shown in FIG. 11A, the step-down switching regulator 8 can drive the increased load in a stable manner.

At time t3, the load detection signal S12 from the load detecting circuit 42 varies from "L" level to "H" level, as shown in FIG. 11C. At this time, the operation command signal S11 is in "H" level. Thus, the state of the operating step-down switching regulator 8 does not change.

Subsequently, the load is reduced at time t4 as shown in FIG. 11A. At this time, the operation command signal S11 is in "H" level. Thus, the state of the operating step-down switching regulator 8 does not change.

As the operation command signal S11 varies from "H" level to "L" level at time t5 as shown in FIG. 11B, the output of the OR circuit 41 changes from "H" level to "L" level as shown in FIG. 11D. The output of the inverter 43 varies from "L" level to "H" level as shown in FIG. 11E.

Therefore, the step-down switching regulator 8 is stopped while the series regulator 2 is activated to output the output voltage of the series regulator 2 through the output terminal 7.

At time t5, the load detection signal S12 from the load detecting circuit 42 changes from "H" level to "L" level. Therefore, the power supply apparatus can be operated depending on the load even though the operation command signal S11 is not normal at time t5.

Subsequently, such a procedure will be repeated so that the step-down switching regulator 8 or series regulator 2 can selectively be operated depending on the load.

As described, the fourth embodiment can reduce the current consumption when a load is light and improve the entire power conversion efficiency in the power supply apparatus as in the second embodiment.

The power supply apparatus according to the fourth embodiment is designed to selectively operate the step-down switching regulator 8 and series regulator 2 by using the operation command signal S11 which has been pre-generated depending on the predicted or scheduled change of a load, thereby taking out the output voltage on the operating side. As a result, the step-down switching regulator 8 and series regulator 2 can be appropriately selected and operated depending on the change of a load.

Furthermore, the fourth embodiment controls the selective operation of the step-down switching regulator 8 and series regulator 2 by using the load detection signal S12 in addition to the operation command signal S11. In this way, the power supply apparatus can operate with more assurance and stability compared to a case in which only the operation command signal S11 is used.

A power supply apparatus constructed in accordance with a fifth embodiment of the present invention will be described with reference to FIG. 12.

Figure 12:
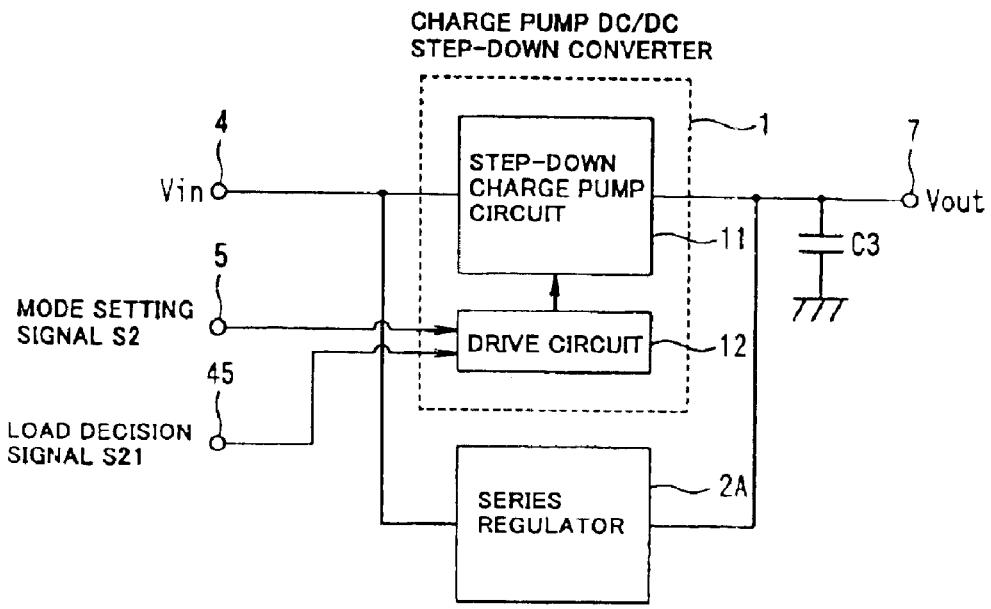
FIG. 12 shows a block diagram of a power supply apparatus constructed in accordance with a fifth embodiment of the present invention.

The power supply apparatus of the fifth embodiment comprises a charge pump DC/DC step-down converter 1 and a series regulator 2A, which have different characteristics and are connected in parallel between an input terminal 4 and an output terminal 7, as shown in FIG. 12. The series regulator 2A is operated at all times while the step-down DC/DC converter 1 is operated depending on a load decision signal S21 inputted into a control terminal. The load decision signal S21 is thus fed into a drive circuit 12 in the step-down DC/DC converter 1.

The load decision signal S21 depends on the size of a load. When the load is heavy, the load decision signal S21 is in "H" level and when the load is light, the load decision signal S21 is in "L" level.

The step-down DC/DC converter 1 is configured as in the step-down DC/DC converter 1 of FIG. 1. The series regulator 2A is substantially the same as the series regulator 2 of FIG. 3 except that the switch SW1 of FIG. 3 is omitted and that the light load judging signal S1 will not be fed into the error amplifier 21 of FIG. 3.

The output voltage of the series regulator 2A which constantly operates is selected so that the output voltage is slightly smaller than that of the step-down DC/DC converter 1 operated if necessary. For example, when the output voltage of the step-down DC/DC converter is set to be equal to 3.0 (V), the output voltage of the series regulator 2A is set to be about several tens (mV) smaller than 3.0 (V). The reason will be described later.

The operation of the power supply apparatus according to the fifth embodiment will be described with reference to FIGS. 3 and 12.

It will first be described that as the load decision signal S21 switches from "H" level indicating a heavy load to "L" level indicating a light load, the step-down DC/DC converter 1 is stopped while only the series regulator 2A is being operated. It is assumed that the step-down DC/DC converter 1 outputs a set voltage which may be equal to 3.0 V, for example.

In such a case, the error amplifier 21 shown in FIG. 3 is operating since the series regulator 2A is operating at all times. The output value of the series regulator 2A has been set so that it is several tens mV smaller than 3.0 V. Although the error amplifier 21 is operating, the output MOS transistor Q21 thereof is placed in its standby state wherein it is turned off.

As the load decision signal S21 changes from "H" level to "L" level, the step-down DC/DC converter 1 is shut off. As the output voltage Vout is lowered down to the set value in the series regulator 2A, the error amplifier 21 activates the MOS transistor Q21. Thus, the series regulator 2A maintains its set output.

Since the error amplifier 21 is operating at all times as described, time required to stabilize the power supply apparatus from its starting point may extremely be short, thus preventing the output from being dropped.

It will now be described that as the load decision signal S21 switches from "L" level to "H" level, the step-down DC/DC converter 1 is activated.

As the step-down DC/DC converter 1 is activated, the series regulator 2A continues to operate until the output voltage Vout exceeds the set value of the series regulator 2A which has been set to be several tens mV smaller than 3.0 V. However, when the output voltage Vout exceeds this set value in the series regulator as the output of the step-down DC/DC converter 1 is increasing up to 3.0 V, the series regulator 2A automatically turns the MOS transistor Q21 off through the error amplifier 21.

In such a manner, the drop of output can be avoided by continuing the series regulator 2A to operate until the output of the step-down DC/DC converter 1 from its starting point is stabilized.

As described, the fifth embodiment can reduce the current consumption when the load is light, thereby improving the entire power conversion efficiency in the power supply apparatus, as in the first embodiment.

Furthermore, the fifth embodiment can prevent the output of the power supply apparatus from being dropped when the step-down DC/DC converter is activated or inactivated.

A power supply apparatus constructed in accordance with a sixth embodiment of the present invention will be described with reference to FIG. 13.

Figure 13:
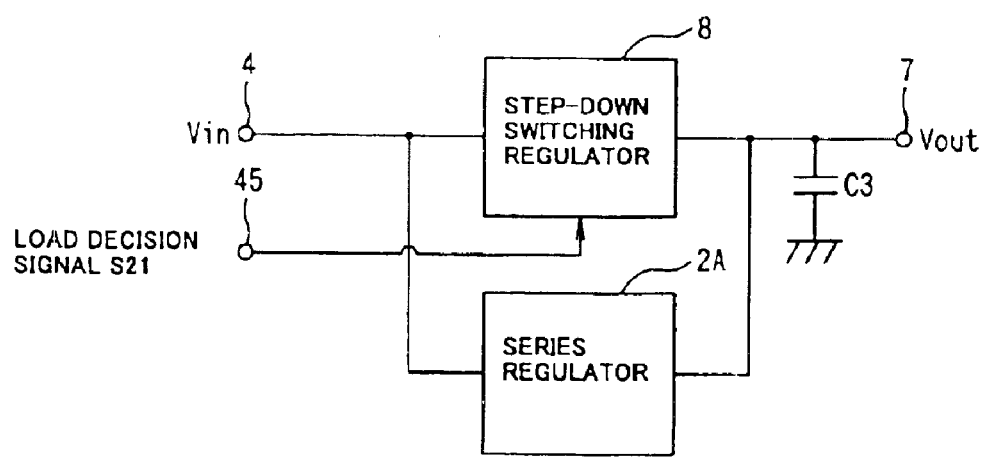
FIG. 13 shows a block diagram of a power supply apparatus constructed in accordance with a sixth embodiment of the present invention.

The power supply apparatus of the sixth embodiment comprises a step-down switching regulator 8 and a series regulator 2A, which have different characteristics and are connected in parallel between an input terminal 4 and an output terminal 7, as shown in FIG. 13. The series regulator 2A is operated at all times while the step-down switching regulator 8 is operated depending on a load decision signal S21 inputted into a control terminal 45. The load decision signal S21 as in the fifth embodiment is thus fed into the step-down switching regulator 8.

The step-down switching regulator 8 is similar to the step-down switching regulator 8 shown in FIG. 7. The series regulator 2A is similar to the series regulator 2A of the fifth embodiment.

The series regulator 2A and step-down switching regulator 8 are configured so that the output voltage of the always operating series regulator 2A is slightly smaller than that of the step-down switching regulator 8 operated if necessary. For example, when the output voltage of the step-down switching regulator 8 is set to be equal to 3.0 (V), the output voltage of the series regulator 2A is set to be about several tens (mV) smaller than 3.0 (V). The reason will be described later.

The operation of the power supply apparatus according to the sixth embodiment will be described with reference to FIGS. 3 and 13.

It will first be described that as the load decision signal S21 switches from "H" level indicating a heavy load to "L" level indicating a light load, the step-down switching regulator 8 is inactivated while only the series regulator 2A is being operated. It is assumed that the step-down switching regulator 8 outputs a set voltage which may be equal to 3.0 V, for example.

In such a case, the error amplifier 21 shown in FIG. 3 is operating since the series regulator 2A is operating at all times. The output value of the series regulator 2A has been set so that it is several tens mV smaller than 3.0 V. Although the error amplifier 21 is operating, the output MOS transistor Q21 thereof is placed in its standby state wherein it is turned off.

As the load decision signal S21 changes from "H" level to "L" level, the step-down switching regulator 8 is shut off. As the output voltage Vout is lowered down to the set value in the series regulator 2A, the error amplifier 21 activates the MOS transistor Q21. Thus, the series regulator 2A maintains its set output.

Since the error amplifier 21 is operating at all times as described, time required to stabilize the power supply apparatus from its starting point may be extremely short, thus preventing the output from being dropped.

It will now be described that as the load decision signal S21 switches from "L" level to "H" level, the step-down switching regulator 8 is activated.

As the step-down switching regulator 8 is activated, the series regulator 2A continues to operate until the output voltage Vout exceeds the set value of the series regulator 2A which has been set to several tens mV smaller than 3.0 V. However, when the output voltage Vout exceeds this set value in the series regulator as the output of the step-down switching regulator 8 is increasing up to 3.0 V, the series regulator 2A automatically turns the MOS transistor Q21 off through the error amplifier 21.

In such a manner, the drop of output can be avoided by continuing the series regulator 2A to operate until the output of the step-down switching regulator 8 from its starting point is stabilized.

As described, the sixth embodiment can reduce the current consumption when a load is light, thereby improving the entire power conversion efficiency in the power supply apparatus, as in the second embodiment.

Furthermore, the sixth embodiment can prevent the output of the power supply apparatus from being dropped when the step-down switching regulator 8 is activated or inactivated.

A power supply apparatus constructed in accordance with a seventh embodiment of the present invention will be described with reference to FIG. 14.

Figure 14:
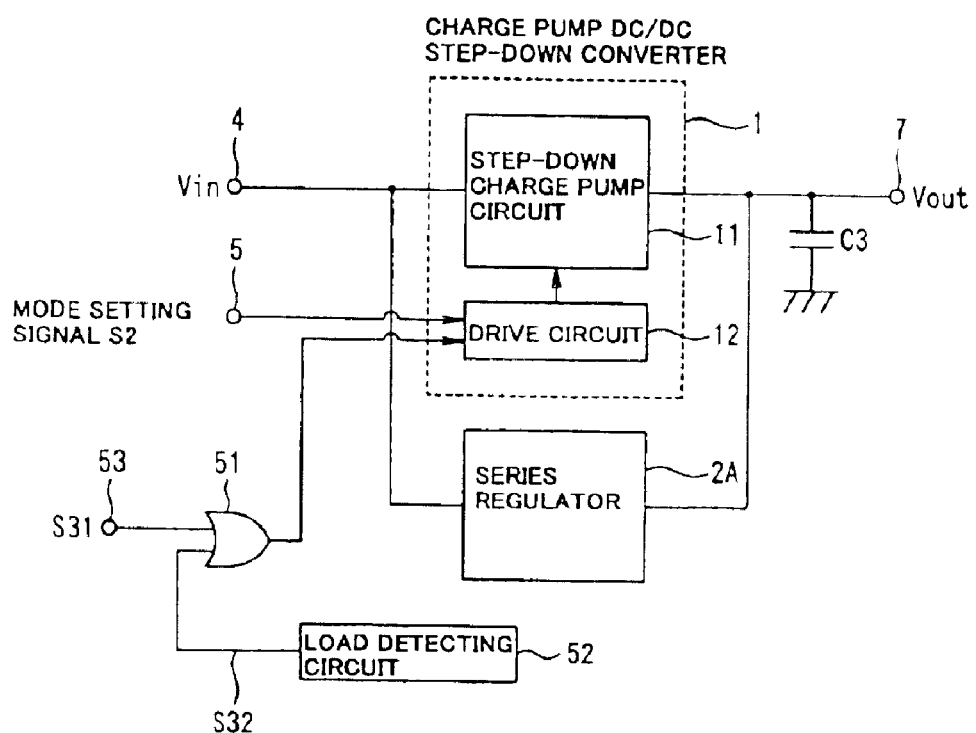
FIG. 14 shows a block diagram of a power supply apparatus constructed in accordance with a seventh embodiment of the present invention.

As shown in FIG. 14, the power supply apparatus comprises a charge pump step-down DC/DC converter 1 and a series regulator 2A, the converter and regulator having different characteristics and being connected in parallel between an input terminal 4 and an output terminal 7. The series regulator 2A is operated at all times while the step-down DC/DC converter 1 is controlled by an operation control signal S31 inputted into a control terminal 53 and a load decision signal S32 from a load detecting circuit 52.

The step-down DC/DC converter 1 is similar to the step-down DC/DC converter 1 shown in FIG. 1. The series regulator 2A is similar to the series regulator 2A in the fifth embodiment. The arrangement including the series regulator 2a and the step-down DC/DC converter 1 is similar to that of the fifth embodiment.

A load (not shown) is connected to the power supply apparatus of the seventh embodiment. The load may be controlled by a microcomputer (processor) (not shown) through a predetermined program. On controlling the load, thus, the change of a load can be already known or predicted. For example, a further program for generating the operation control signal S31 for selectively activating the step-down DC/DC converter 1 depending on the predicted or scheduled change of a load may be included in the program.

In the seventh embodiment, thus, the microcomputer generates the operation control signal S31 when the load is being controlled. The generated operation control signal S31 is inputted into an OR circuit 51. The OR circuit 51 also receives the load detection signal S32 outputted by the load detecting circuit 52 when it detects the size of a load, in addition to the aforementioned operation control signal S31. The output signal of the OR circuit 51 is fed into a drive circuit 12 in the step-down DC/DC converter 1.

In the seventh embodiment, therefore, the operation control signal S31 pre-generated depending on the predicted or scheduled change of a load and the load detection signal S32 from the load detecting circuit 52 are ORed by the OR circuit 51, the result being then used to control the charge pump DC/DC step-down converter 1.

Figure 15:
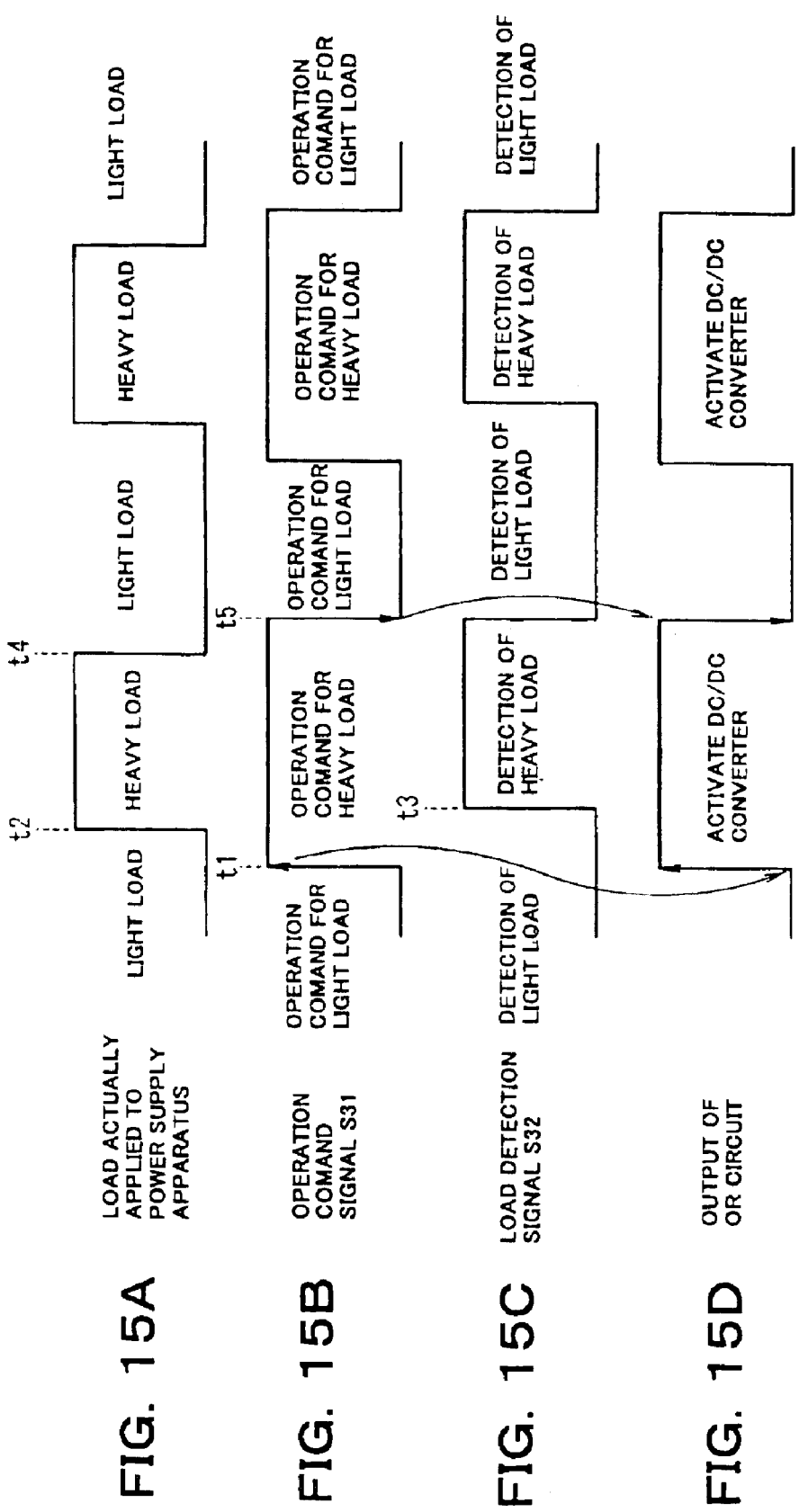
FIGS. 15A to 15D show waveforms at various parts in the seventh embodiment.

The operation of the power supply apparatus according to the seventh embodiment will be described with reference to FIGS. 14 and 15.

In the seventh embodiment, the series regulator 2A is always placed in an active state after the power supply apparatus has been powered on. On the other hand, the step-down DC/DC converter 1 is controlled by the operation control signal S31 and load detection signal S32. The operation of the step-down DC/DC converter 1 will be described.

It will now be described that the load on the power supply apparatus of the seventh embodiment is controlled by a microcomputer (not shown) and that the load varies as shown in FIG. 15A. It is now assumed that the operation control signal S31 corresponding to the already known change of a load as shown in FIG. 15B is inputted from the microcomputer into the OR circuit 51.

It is also assumed that the operation control signal S31 is in "H" level for a heavy load and in "L" level a light load, as shown in FIG. 15B.

When the operation control signal S31 changes from "L" level to "H" level at time t1 as shown in FIG. 15B, the output of the OR circuit 51 varies from "L" level to "H" level as shown in FIG. 15D.

As a result, the drive circuit 12 is initiated to activate the step-down DC/DC converter 1. Therefore, the step-down DC/DC converter 1 can be placed in its stable standby state for a large load.

When the load is subsequently increased at time t2 as shown in FIG. 15A, the step-down DC/DC converter 1 can drive the increased load in a stable manner.

At time t3, the load detection signal S32 from the load detecting circuit 52 varies from "L" level to "H" level, as shown in FIG. 15C. At this time, the operation control signal S31 is in "H" level. Thus, the state of the operating step-down DC/DC converter 1 does not change.

Subsequently, the load is reduced at time t4 as shown in FIG. 15A. At this time, the operation control signal S31 is in "H" level. Thus, the state of the operating step-down DC/DC converter 1 does not change.

As the operation control signal S31 varies from "H" level to "L" level at time t5 as shown in FIG. 15B, the output of the OR circuit 51 changes from "H" level to "L" level as shown in FIG. 15D.

Therefore, the drive circuit 12 is stopped to halt the step-down DC/DC converter 1 while the output voltage of the series regulator 2A is outputted toward the output terminal 7.

At time t5, the load detection signal S32 from the load detecting circuit 52 changes from "H" level to "L" level. Therefore, the power supply apparatus can be operated depending on the load even though the operation command signal S11 is not normal at time t5.

Subsequently, such a procedure is repeated so that the step-down DC/DC converter 1 can be operated or stopped depending on the load.

As described, the seventh embodiment can reduce the current consumption when a load is light and improve the entire power conversion efficiency in the power supply apparatus as in the first embodiment.

The power supply apparatus according to the seventh embodiment is designed to control the step-down DC/DC converter 1 by using the operation control signal S31 which has been pre-generated depending on the predicted or scheduled change of a load. As a result, the step-down DC/DC converter 1 can be appropriately operated depending on the change of a load.

Furthermore, the seventh embodiment can control the operation of the step-down DC/DC converter 1 by using the load detection signal S32 in addition to the operation control signal S31. In this way, the power supply apparatus can operate with more assurance and stability compared to a case in which only the operation control signal S31 is used.

A power supply apparatus constructed in accordance with an eighth embodiment of the present invention will be described with reference to FIG. 16.

Figure 16:
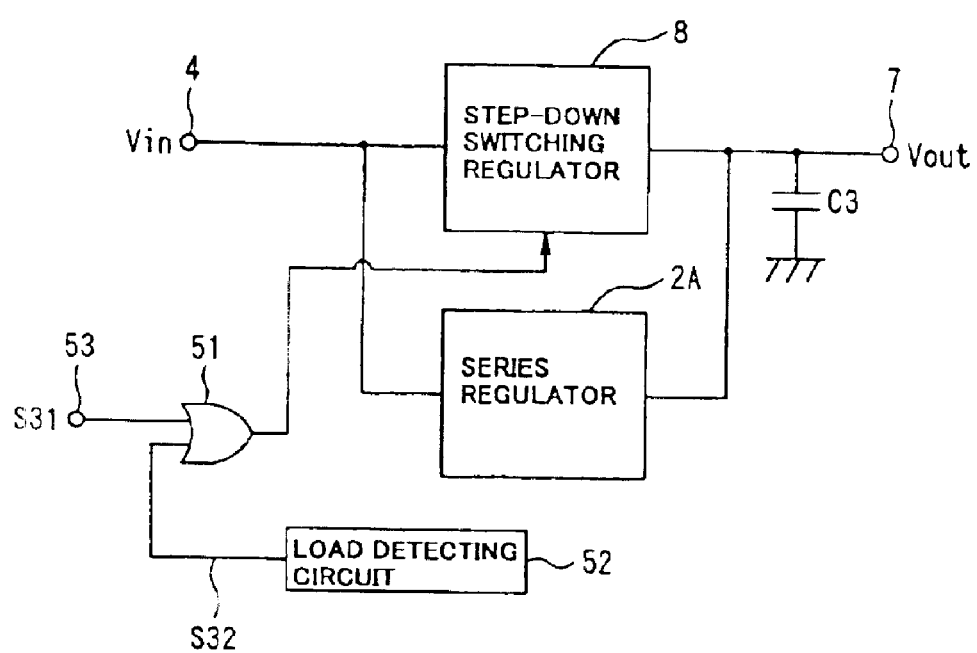
FIG. 16 shows a block diagram of a power supply apparatus constructed in accordance with an eighth embodiment of the present invention.

As shown in FIG. 16, the power supply apparatus comprises a step-down switching regulator 8 and a series regulator 2A, the converter and regulator having different characteristics and being connected in parallel between an input terminal 4 and an output terminal 7. The series regulator 2A is operated at all times while the step-down switching regulator 8 is controlled by an operation control signal S31 inputted into a control terminal 53 and a load decision signal S32 from a load detecting circuit 52.

The step-down switching regulator 8 is similar to the step-down switching regulator 8 shown in FIG. 7. The series regulator 2A is similar to the series regulator 2A in the fifth embodiment. The arrangement including the series regulator 2a and the step-down switching regulator 8 is similar to that of the sixth embodiment.

In the eighth embodiment, a microcomputer is used to generate the operation control signal S31 when a load is being controlled, as in the seventh embodiment. The generated operation control signal S31 is then inputted into an OR circuit 51. The OR circuit 51 also receives the load detection signal S32 outputted by the load detecting circuit 52 when it detects the size of a load, in addition to the aforementioned operation control signal S31. The output signal of the OR circuit 51 is fed into the step-down switching regulator 8.

In the eighth embodiment, therefore, the operation control signal S31 pre-generated depending on the predicted or scheduled change of a load and the load detection signal S32 from the load detecting circuit 52 are ORed by the OR circuit 51, the result being then used to control the step-down switching regulator 8.

The operation of the power supply apparatus according to the eighth embodiment will be described with reference to FIGS. 16 and 17.

In the eighth embodiment, the series regulator 2A is always placed in an active state after the power supply apparatus has been powered on. On the other hand, the step-down switching regulator 8 is controlled by the operation control signal S31 and load detection signal S32. The operation of the step-down switching regulator 8 will be described.

It will now be described that the load on the power supply apparatus of the eighth embodiment is controlled by a microcomputer (not shown) and that the load varies as shown in FIG. 17A. It is now assumed that the operation control signal S31 corresponding to the already known change of a load as shown in FIG. 17B is inputted from the microcomputer into the OR circuit 51.

It is also assumed that the operation control signal S31 is in "H" level for a heavy load and in "L" level for a light load, as shown in FIG. 17B.

When the operation control signal S31 changes from "L" level to "H" level at time t1 as shown in FIG. 17B, the output of the OR circuit 51 varies from "L" level to "H" level as shown in FIG. 17D.

As a result, the drive circuit 12 is activated. Therefore, the step-down switching regulator 8 can be placed in a stable state for a heavy load.

When the load is subsequently increased at time t2 as shown in FIG. 17A, the step-down switching regulator 8 can drive the increased load in a stable manner.

At time t3, the load detection signal S32 from the load detecting circuit 52 varies from "L" level to "H" level, as shown in FIG. 17C. At this time, the operation control signal S31 is in "H" level. Thus, the state of the operating step-down switching regulator 8 does not change.

Subsequently, the load is reduced at time t4 as shown in FIG. 17A. At this time, the operation control signal S31 is in "H" level. Thus, the state of the operating step-down switching regulator 8 does not change.

As the operation control signal S31 varies from "H" level to "L" level at time t5 as shown in FIG. 17B, the output of the OR circuit 51 changes from "H" level to "L" level as shown in FIG. 17D. Thus, the step-down switching regulator 8 is inactivated while the output voltage of the series regulator 2A is outputted toward the output terminal 7.

At time t5, the load detection signal S32 from the load detecting circuit 52 changes from "H" level to "L" level. Therefore, the power supply apparatus can be operated depending on the load even though the operation command signal S11 is not normal at time t5.

Subsequently, such a procedure will be repeated so that the step-down switching regulator 8 can be activated or inactivated depending on the load.

As described, the eighth embodiment can reduce the current consumption when the load is light and improve the entire power conversion efficiency in the power supply apparatus as in the second embodiment.

The power supply apparatus according to the eighth embodiment is designed to control the step-down switching regulator 8 by using the operation control signal S31 which has been pre-generated depending on the predicted or scheduled change of load. As a result, the step-down switching regulator 8 can appropriately be operated depending on the change of a load.

Furthermore, the eighth embodiment can control the operation of the step-down switching regulator 8 by using the load detection signal S32 in addition to the operation control signal S31. In this way, the power supply apparatus may operate with more assurance and stability compared to a case in which only the operation control signal S31 is used.

As described above, the present invention provides a power supply apparatus that can reduce its current consumption when a load is light and improve its overall power conversion efficiency.

What is claimed is:

1. A power supply apparatus comprising:
a charge pump DC/DC converter having a capacitor for charging and discharging; and
a series regulator,
wherein the charge pump DC/DC converter and the series regulator are operated depending on an operation command,
wherein the series regulator comprises:
an input terminal into which an input voltage is inputted;
an output terminal from which an output voltage is outputted;
a transistor connected between the input and output terminals;
an error amplifier in which an output signal from the error amplifier is inputted to a gate of the transistor;
a first resistor, a second resistor and a switching element connected in series between the output terminal and a predetermined potential terminal, wherein the error amplifier has input terminals to which a reference potential and a potential at a node between the first and second resistors are inputted, and wherein the switching element is turned on or turned off based on the operation command.

2. A power supply apparatus comprising:

a DC/DC converter; and a series regulator, wherein the DC/DC converter and the series regulator are operated depending on an operation command, and wherein the series regulator comprises:

an input terminal into which an input voltage is inputted;

an output terminal from which an output voltage is outputted;

a transistor connected between the input and output terminals;

an error amplifier in which an output signal from the error amplifier is inputted to a gate of the transistor;

a first resistor, a second resistor and a switching element connected in series between the output terminal and a predetermined potential terminal, wherein the error amplifier has input terminals to which a reference potential and a potential at a node between the first and second resistors are inputted, and wherein the switching element is turned on or turned off based on the operation command.

3. A power supply apparatus comprising:

a switching regulator; and a series regulator, wherein the switching regulator and the series regulator are operated depending on an operation command, and wherein the series regulator comprises:

an input terminal into which an input voltage is inputted;

an output terminal from which an output voltage is outputted;

a transistor connected between the input and output terminals;

an error amplifier in which an output signal from the error amplifier is inputted to a gate of the transistor;

a first resistor, a second resistor and a switching element connected in series between the output terminal and a predetermined potential terminal, wherein the error amplifier has input terminals to which a reference potential and a potential at a node between the first and second resistors are inputted, and wherein the switching element is turned on or turned off based on the operation command.

* * * * *

UNITED STATES PATENT AND TRADEMARK OFFICE
CERTIFICATE OF CORRECTION

PATENT NO. : 6,903,538 B2 Page 1 of 1
DATED : June 7, 2005
INVENTOR(S) : Hiroyuki Umeda et al.

It is certified that error appears in the above-identified patent and that said Letters Patent is hereby corrected as shown below:

<u>Column 1,</u>
Line 9, "2001" should be -- 2002 --.
Line 37, "convention" should be -- conversion --.

<u>Column 6,</u>
Lines 13-14, "non-complimentarily" should be -- non-complementarily --.

Signed and Sealed this

Twenty-third Day of May, 2006

JON W. DUDAS
*Director of the United States Patent and Trademark Office*